(12) United States Patent
Kewitsch

(10) Patent No.: US 10,977,458 B2
(45) Date of Patent: Apr. 13, 2021

(54) AUTOMATED PHYSICAL NETWORK MANAGEMENT SYSTEM UTILIZING HIGH RESOLUTION RFID AND OPTICAL SCANNING FOR RFID TAG SPATIAL LOCALIZATION

(71) Applicant: Telescent Inc., Irvine, CA (US)

(72) Inventor: Anthony Stephen Kewitsch, Santa Monica, CA (US)

(73) Assignee: Telescent Inc., Irvine, CA (US)

( * ) Notice: Subject to any disclaimer, the term of this patent is extended or adjusted under 35 U.S.C. 154(b) by 0 days.

(21) Appl. No.: 16/504,166

(22) Filed: Jul. 5, 2019

(65) Prior Publication Data

US 2020/0005001 A1 Jan. 2, 2020

Related U.S. Application Data

(63) Continuation of application No. PCT/US2017/069148, filed on Dec. 30, 2017.

(51) Int. Cl.
*G06K 7/08* (2006.01)
*G06K 7/10* (2006.01)
*H04B 10/2575* (2013.01)
*H04Q 11/00* (2006.01)

(52) U.S. Cl.
CPC ..... *G06K 7/10366* (2013.01); *H04B 10/2575* (2013.01); *H04Q 11/0001* (2013.01); *H04Q 2011/0058* (2013.01)

(58) Field of Classification Search
CPC .......... G02B 6/24; G02B 6/3895; G02B 6/44; G06K 7/10366; H04B 10/2575; H04Q 11/0001; H04Q 2011/0058
See application file for complete search history.

(56) References Cited

U.S. PATENT DOCUMENTS

| | | | | |
|---|---|---|---|---|
| 7,432,817 B2* | 10/2008 | Phipps | ........ | G06K 7/0008 235/385 |
| 7,642,916 B2* | 1/2010 | Phipps | ........ | G06K 7/0008 235/375 |
| 7,885,795 B2* | 2/2011 | Rasmussen | ........ | H05K 7/20836 703/5 |
| 8,010,999 B2* | 8/2011 | Fujita | ........ | H02G 3/00 713/169 |
| 8,111,163 B2* | 2/2012 | Utaka | ........ | H01B 7/368 235/375 |
| 8,258,953 B2* | 9/2012 | Stern | ........ | G06K 7/0008 340/10.1 |

(Continued)

FOREIGN PATENT DOCUMENTS

WO 2016151505 A1 9/2016

OTHER PUBLICATIONS

WIPO, International Search Report received in International Application No. PCT/US2017/069148, dated May 2, 2018, (4p.).

(Continued)

*Primary Examiner* — Thien M Le
(74) *Attorney, Agent, or Firm* — Siritzky Law, PLLC

(57) ABSTRACT

Apparatus and methods automatically track the physical connection configuration of fiber optic cables using high spatial resolution RFID tag readout and high-resolution optical scanning. In further embodiments, the acquisition of RFID and/or optical scans are performed by a robotic scanning system.

19 Claims, 11 Drawing Sheets

(56) References Cited

U.S. PATENT DOCUMENTS

| | | | |
|---|---|---|---|
| 9,908,239 B1* | 3/2018 | O'Brien | B25J 9/02 |
| 2008/0240724 A1 | 10/2008 | Aguren et al. | |
| 2010/0098425 A1 | 4/2010 | Kewitsch | |
| 2017/0313421 A1* | 11/2017 | Gil | B65G 1/06 |
| 2019/0161190 A1* | 5/2019 | Gil | B64F 1/02 |

OTHER PUBLICATIONS

WIPO, International Written Opinion received in International Application No. PCT/US2017/069148, dated May 2, 2018, (5p.).
Wipo, International Preliminary Report on Patentability received in International Application No. PCT/US2017/069148, dated Jun. 30, 2020, (6p.).

* cited by examiner

AUTOMATED PHYSICAL NETWORK MANAGEMENT SYSTEM UTILIZING HIGH RESOLUTION RFID AND OPTICAL SCANNING FOR RFID TAG SPATIAL LOCALIZATION

RELATED APPLICATIONS

This application is a continuation of application no. PCT/US2017/069148 filed Dec. 30, 2017, the entire contents of which are hereby fully incorporated herein by reference for all purposes.

FIELD OF THE INVENTION

This invention relates to methods and apparatus for managing and automating the physical connectivity of optical fiber networks, in particular, automated systems to inventory, locate, discover and test a network with a large number of physical communication links comprised of optical and electronic network elements joined by network cables.

BACKGROUND

High bandwidth fiber optic communication networks consist of multiple interconnected physical network links, each link including a length of optical fiber cable, a multiplicity of network elements with optical network interfaces, and potentially a multiplicity of network elements with electronic network interfaces. Typical optical interfaces utilize fiber optic cables with LC or MPO connectors and support 10 Gbps to 100 Gbps+ data rates, and typical electronic interfaces utilize copper cabling and 1 Gbps to 10 Gbps data rates. Large scale data center networks are enormously complex and are comprised of 100 thousand to 1 million links, generally arranged in a hierarchical tree, interconnected mesh, ring, or a hub and spoke type arrangement.

The mapping of this large number of links within the physical layer, regardless of the details of the specific network architecture, is in many ways analogous to mapping today's highways and streets. However, the dynamic nature of the communication links, the lack of adequate link locating tools and their heterogeneity (fiber type, bandwidth, data rate, wavelength, modulation format, etc.) add layers of complexity. New tools to manage this are in particular need.

Improved means to effectively document, map and reroute physical interconnections within the network are required. Existing RFID (radio frequency identification) technology can be used to identify network elements and network cables. However, while RFID systems enable assets to be identified, automated discovery of the interrelations between network elements and cables (e.g. how they are interconnected to create the network topology) and their precise physical locations are outside the capability of current technologies.

Automated systems for data center and telecommunications service providers to discover and track the physical connectivity relationships between network links are in great demand. Such systems enable new modes of operation supporting applications such as same day provisioning and one-touch deployment of high bandwidth fiber services, in addition to the obvious benefits of eliminating network downtime due to human errors and physical database inconsistencies with the actual network. Moreover, if physical networks are able to implement two key breakthroughs: accurate fiber interconnection database and software-defined, reconfigurable cross-connections, there is the added benefit of operational expense savings by reducing the need to deploy service vehicles (i.e. truck rolls).

Extensions to current RFID technology are needed to enable an accurate fiber interconnection database. Standard Low Frequency (LF) passive RFID tags operate at frequencies of 125 kHz and 134.3 kHz and provide a read distance of 10 cm. RFID integrated circuit chips have been developed (e.g. NXP Semiconductor) for low-frequency (LF) passive RFID transponders compliant with the ISO 11784 and 11785 standards, including an anti-collision algorithm that can be used to read more than one tag in the same reader's field. Alternative approaches include High Frequency (HF) passive RFID tags that operate at 13.56 MHz and have a maximum read distance of typically one to a few meters. However, these approaches do not provide accurate determination of position or the physical relationships between interconnections (e.g. what cable is plugged into what port).

A technology to improve the spatial resolution in which the three-dimensional location of miniature RFID tags (<5 mm per side) can be measured with high accuracy (to within <5 mm) is of great importance to extend the application of RFID tags to network connectivity discovery. Today's state-of-the-art RFID tag scanning technologies use active ultra-wideband (UWB) RFID systems and are able to discriminate the location of a tagged object in three dimensions to within a few tens of cm. For example, a system that pinpoints a tag's location to within 10 cm has been described [RFID Journal, Jun. 30, 2014, "DecaWave Intros Ultra-wideband Active RFID Module"]. However, these active UWB tags are costly (>$10), require power (i.e. a battery) and are large (~3×3×3 cm), making them ill-suited for deployment in high-density fiber optic network port identification applications. An alternative approach uses a phased-array antenna system to locate passive tags in three-dimensional space to within about 1 meter [RFID Journal, Apr. 14, 2008, "Mojix Takes Passive UHF RFID to a New Level"]; however, this spatial resolution is three orders of magnitude less than required.

Other approaches to locate electronic devices in three dimensions, although not necessarily tags, utilize the GPS satellite-based positioning system. However, this does not perform well indoors, especially in the highly shielded environments of data centers, nor does it attain mm spatial resolution. For indoor environments, positioning systems that rely on existing wireless RF network infrastructures, such as Wi-Fi positioning system or Bluetooth, are able to provide location accuracies ranging from 1 to 10 m ["The Study on Using Passive RFID Tags for Indoor Positioning", S. L. Ting et al., International Journal of Engineering Business Management, Vol. 3, No. 1 (2011)].

Therefore, until now, the inability to accurately locate RFID tags to within a few mm in three-dimensional space and the inability to miniaturize RFID tags to a few mm in size prevent RFID technology from being widely deployed in data centers and telecommunications facilities. Thus, there remains a significant need to track the connectivity of all network cables within a facility and these cables are currently invisible to network management systems.

SUMMARY OF THE INVENTION

The present invention is comprised of a highly scalable network cable configuration-tracking system, utilizing a network of unique, miniature RFID tags that can be read out with spatial resolution of <5 mm. The data generated by these RFID scans is augmented by three-dimensional optical scans, then merged and processed to construct an accurate and complete representation of the physical state of the network. In a preferred embodiment, inexpensive, networked RFID readers with multiplexed antenna arrays are integrated with or added externally to fiber optic patch-panels and networking apparatus. Miniature, high resolution RFID tags, typically less than about 50 mm$^3$ in size, are attached to the ports, transceivers, and line cards of network elements, and are read back through an antenna array with high spatial discrimination. In an alternative embodiment, RFID scanning uses a compact RFID probe operating in proximity mode, which is attached to the end of a remotely actuable robotic arm, with the arm being able to be transported to precise locations throughout the data center on a guided motorized platform.

A controller processes RF and optical scans to determine tag location and correspondence to a physical asset. This configuration data is saved within a database of physical configuration records. The precise physical location of each asset, as well as its location and connectivity relationships within the physical network topology, is automatically discovered.

A single large data center is typically comprised of hundreds of thousands of network cables connecting tens of thousands of network elements. Moreover, fiber optic connectors, transceivers, pluggable optics, and related devices continue to undergo significant advances leading to increased bandwidth, density, and reduced size. This places unique demands when applying RFID labeling and interrogation techniques to these miniature devices, compared to traditional warehouse inventory tracking of large packages, etc. Furthermore, it is necessary to know the precise location of all tags, to ascertain where the network cables are attached at both ends.

Compact RFID tags that can be located with high spatial resolution in three-dimensions, and the system to automatically locate and read them within data centers, are thus critically important to support continued scaling of data centers. Moreover, autonomous systems incorporating and processing this tag information are increasingly important to engineer, maintain, optimize, and monitor the physical network link topology.

DETAILED DESCRIPTION OF THE INVENTION

Figure 1:
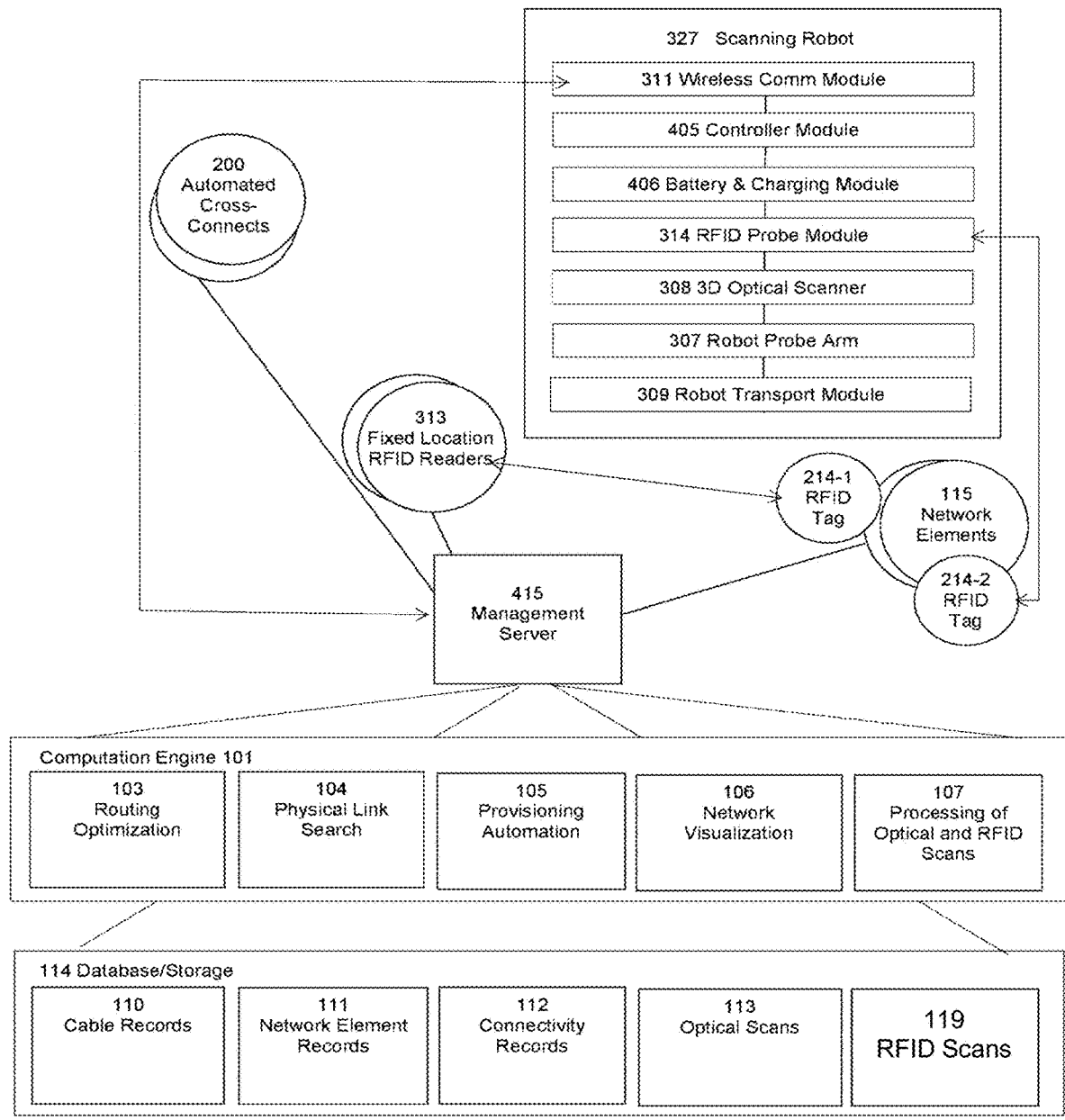
FIG. 1 is a block diagram of a robotic scanning system, as well as the subsystems providing the processing backend of an automated RFID physical link discovery, management and test system constructed in accordance with a preferred embodiment of the present invention.

The present invention comprises systems, apparatus, and methods for automatically discovering and tracking changes to the physical network topology of cables between all network devices in an optical fiber network. The system, a preferred embodiment of which is illustrated in block diagram form in FIG. 1, is controlled by one or more management servers 415 that communicate with one or more scanning robots 327, each robot having RFID and optical scanning capability. The system is used to monitor the connectivity state of a multiplicity of network elements 115 each with a multiplicity of RFID tags 214, and potentially one or more fixed location RFID readers 313 and automated cross-connects 200 (such as those described in Kewitsch et al., U.S. Pat. No. 8,068,715).

Each scanning robot 327 is comprised of a wireless communication module 311, embedded control module 405, battery and charging module 406, RFID probe module 314, robot probe arm 307, optical scanning module 308, and robot transport platform 309. Multiple software modules operate in coordination with the robotic scanning subsystem 327 and reside on the management server 415, including a computational engine 101 comprised of routing optimization 103, physical link search 104, provisioning automation 105, network visualization 106, processing of optical/RFID scans 107, as well as a database 114 comprised of cable records 110, network element records 111, connectivity records 112, optical scans 113, and RFID scans 119.

Figure 2:
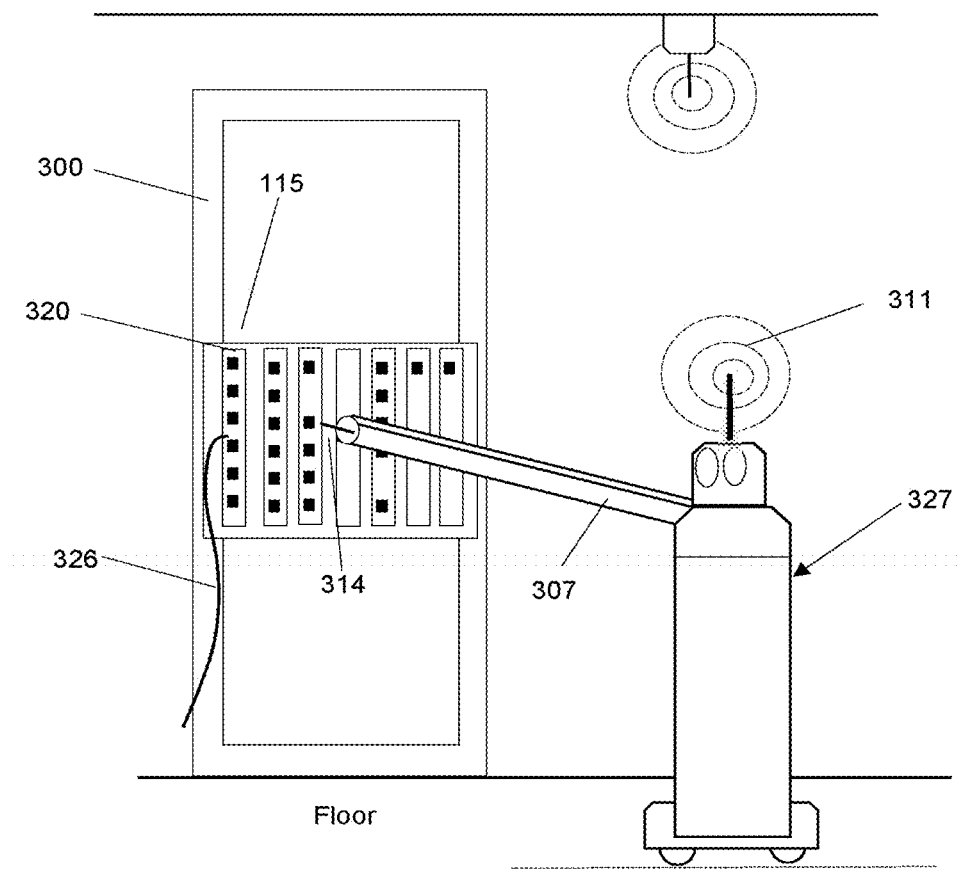
FIG. 2 illustrates a mobile RFID and optical scanning robotic system, wherein the robot is able to traverse each aisle of a data center, position itself adjacent a rack and capture RFID scans of equipment racks.

FIG. 2 illustrates the scanning robot 327 in the process of interrogating an equipment rack 300 containing a multiplicity of network elements 115 with a further multiplicity of network ports 320. The RFID reader module 314 located at the end of the robot probe arm 307 is positioned in the vicinity of a selected RFID tag 214 based on stored position coordinates in network element database record 111. The RFID reader emits an RF signal 310 that energizes a local tag 214, enabling the tag to send back a return signal with its unique identifier, the identifier being phase or amplitude encoded in the return signal.

In case the equipment rack 300 includes a door with a latch (not shown here), the robot arm 307 includes a robot end effector capable of opening the door of rack to gain access to the multiplicity of ports 320 and tags 214 therein. The scanning arm 307 includes encoder-sensing means, which in combination with precise locating capability of robot platform, is used to determine door latch and the tag location in three-dimensional space with relatively high accuracy (<1 mm) This level of accuracy is necessary to properly open the door and to position the scanning RFID probe 314 in close proximity to the tag 214.

Figure 3:
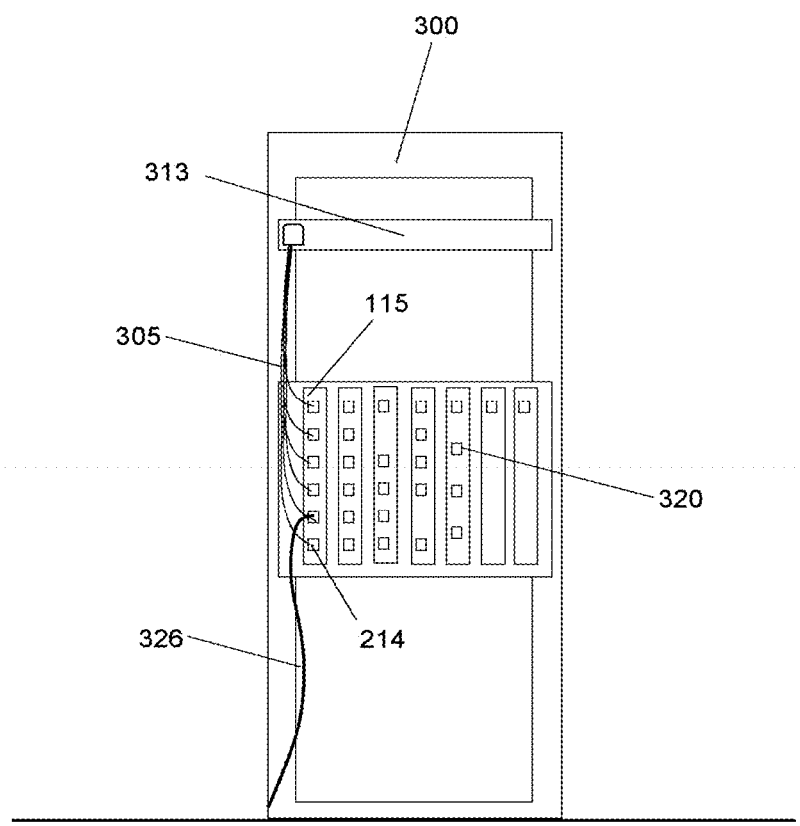
FIG. 3 illustrates an equipment rack with a multiplicity of network ports requiring RFID identification and tracking, which is equipped with a local RFID reader module and instrumented with a multiplicity of RFID reader antenna, each antenna adjacent a particular port.

Moreover, in accordance with the preferred embodiments of the present invention, low frequency RFID readers and tags are utilized that require proximity readout with less than 3 to 4 mm distance between the tag antenna and the reader antenna. Such compact, passive, low frequency RFID tags 214 can not only be read out by moveable RFID probe 314, but also by a distributed array of fixed, multiplexed, individually addressable reader antenna 321 in close proximity to the tags, as shown in FIG. 3. In this approach, each rack 300 includes an RFID reader unit 313, which interfaces to, for example, an RFID antenna harness comprised of a multiplicity of separate and individually addressable, miniature antenna elements 321 located on or in the vicinity of an interface surface 323 of a network element containing one or more network ports 320. The geometry of each interface surface 323 depends on the particulars of the network device. The surface geometry is stored in the database as a solid model associated with the corresponding network element record 110. The antenna element is sufficiently small that it is located at one or about a small number of numbered connector receptacle ports 320. The correspondence between numbered antenna elements and numbered ports is recorded at the time the antenna elements are installed. This configuration information is stored within the network element records database 111 and this correspondence will typically be fixed over the lifecycle of the network element. The RFID tag data, however, is dynamic and changes during the lifecycle of the network element because of updates to the network connectivity resulting from data center migration, load balancing, etc. The stored RFID scan data 119 is used to update the connectivity records database 112, so that the database accurately represents the current inventory of physical connections.

In a further example of this invention, a Low Frequency (LF) RFID reader module emits an RF tag excitation signal at the extended RFID probe 314. The probe comprises electrical components including an inductor and capacitor in parallel, launching the excitation signal with sufficient electromagnetic coupling efficiency to energize and activate any passive RFID tags 214 in close proximity The selection of the inductor dictates the maximum readout range between tag and reader based upon the mutual inductance between tag and reader. In a particular example, the RFID reader transponder is configured for a resonance at 125 kHz by selecting an antenna/coil with L=1 mH and a parallel capacitor of 1.6 nF. Each RFID tag 214 includes its own antenna/coil with substantially similar inductance and capacitance. It is generally desirable that the inductors for both the reader and tag are large in terms of their inductance (~mH), utilize a ferrite core, and are unshielded to maximize the electromagnetic coupling efficiency/mutual inductance between tag and reader.

The tag assembly utilizes a substantially matched LC oscillator that is resonantly coupled to the reader excitation signal and produces a reflected RF signal, with the addition of an amplitude or phase modulation envelop on the 125 kHz carrier signal that carries the unique RFID identifier. The electromagnetic coupling for a system of two coils with a given mutual inductance is highly dependent on the separation, relative field orientation and inductance of the coils. Mutual inductance falls off rapidly with distance between the reader antenna and tag inductor 212, and is significantly reduced once this separation exceeds the physical size of the inductors. At distances less than this size, electromagnetic signals at the 125 kHz resonance frequency are efficiently transferred from the reader to the tag, as well as from the tag to the reader.

In a further example of this invention, a multiplexed, multi-channel RFID reader 313 with a multiplexed antenna array 305 may be utilized instead of or in addition to the RFID probe subsystem of mobile robot 327. Multiplexing of individual antenna elements 304 within the array 305 enables any one of a multiplicity of tags 214 on a multiplicity of cables 326 to be interrogated in rapid time succession by a reader 313 connected to network management server 415. This enables near real-time updates of the physical cabling connectivity for the particular equipment rack 300 served by the particular reader 313. The antenna array's individual antennas 304 are distributed to port locations 320 by running the individual antenna wire pairs and antenna along the interface panel 327 to the vicinity of each port 320 receiving a fiber optic cable 326, or to each physical asset that is tagged.

In a further example, the locations of tags 214 are measured and stored along with the three-dimensional model of the particular network device, the model suitably detailed to distinguish individual ports 320 therein. The antenna elements of the array can be integrated on a flexible substrate overlaid on the equipment front panel. The number of antenna elements 304 may total several hundred, for example, within a single equipment rack 300. When the reader selects a particular antenna for readout, the system thereby knows the location of the tag to within several mm, and based on this location it can correlate the tag identifier with a particular port 320.

Figure 4:
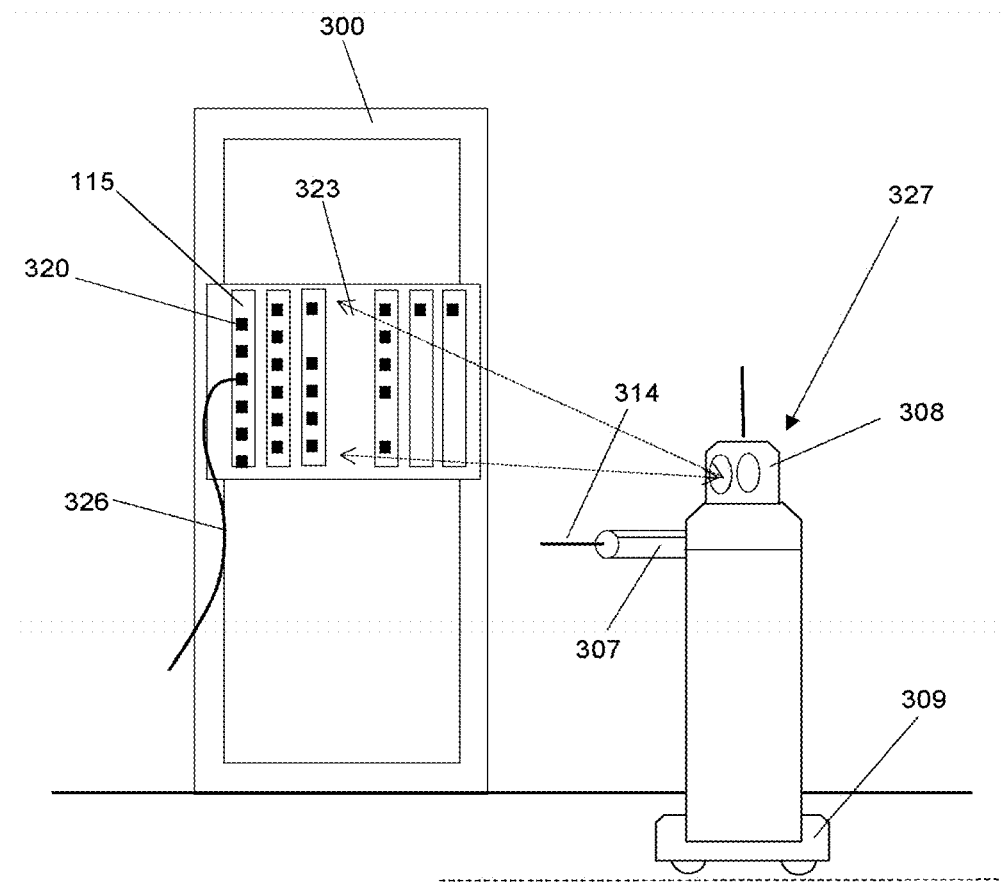
FIG. 4 illustrates the mobile RFID and optical scanning robotic system, wherein the robot is configured to capture optical scans of equipment racks.
Figure 5:
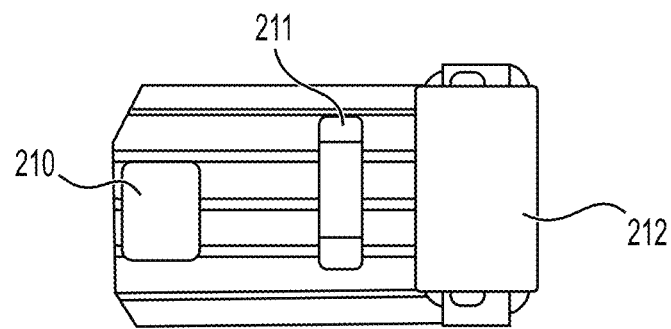
FIG. 5 illustrates a compact implementation of the passive RFID tag, which is folded to form a three-level stacked circuit.
Figure 5:
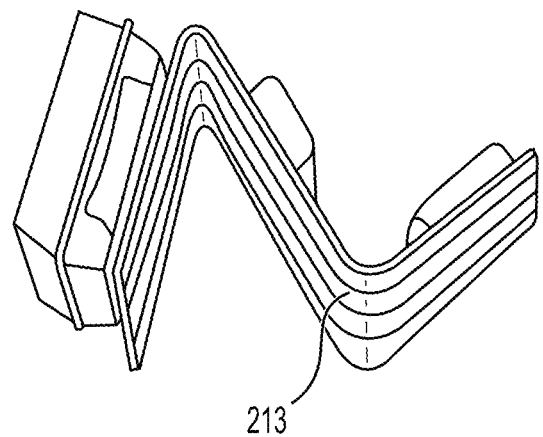
Figure 5:
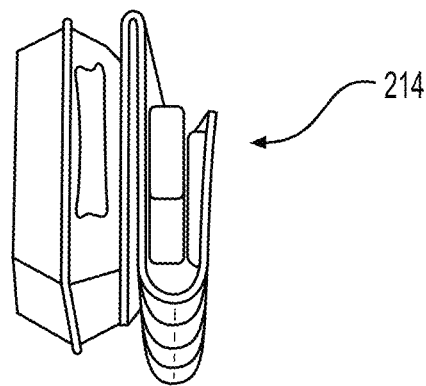

The RFID data measured by the aforementioned techniques are augmented as shown in FIG. 4 by an optical scanner head 308 on scanning robot 327. The three-dimensional geometry of each network interface panel 323 is captured by optical scanning and by potentially stitching together multiple optical scans to cover the entire rack. Optical scanning allows the location of the connector ports 320 to be determined, referenced, and stored within the database, enabling comparison to future measurements at the same port to determine if the connection status has changed. This location information is used to position the RFID probe arm 323 in the vicinity of the tag during readout. To generate the solid models, three-dimensional optical scanning systems 308 use various techniques, such as LIDAR (Light Detection and Ranging), structured light, scanning lasers and stereoscopic cameras. In principle, any of these techniques can be used, as long as they have sufficient spatial resolution of at least 1 mm. Examples of suitable cameras include the FARO EDGE SCANARM HD with ±25 μm (±0.001 in) accuracy and a fast scan rate of 560,000 points/sec.

Packaged RFID Passive Receiver/Tag

Figure 6:
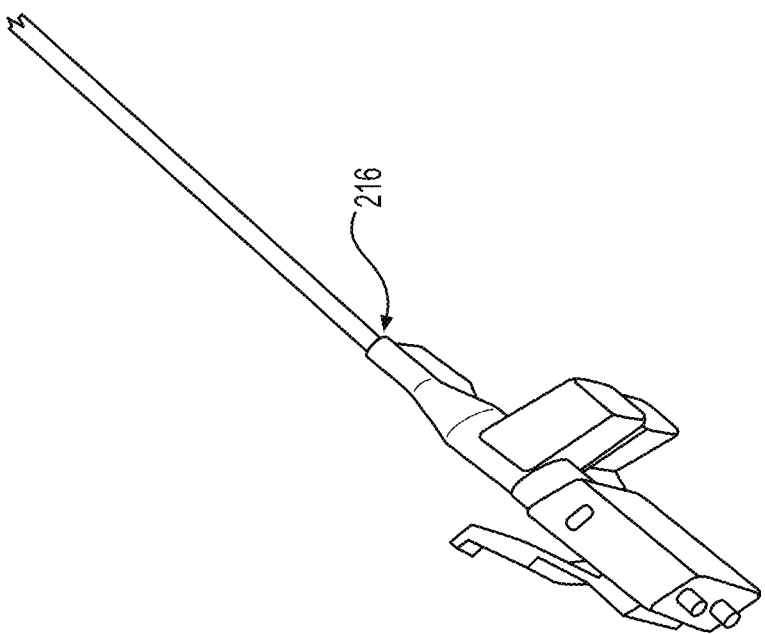
FIG. 6 illustrates RFID tags integrated with common LC fiber optic components, namely LC simplex and duplex connectors.
Figure 6:
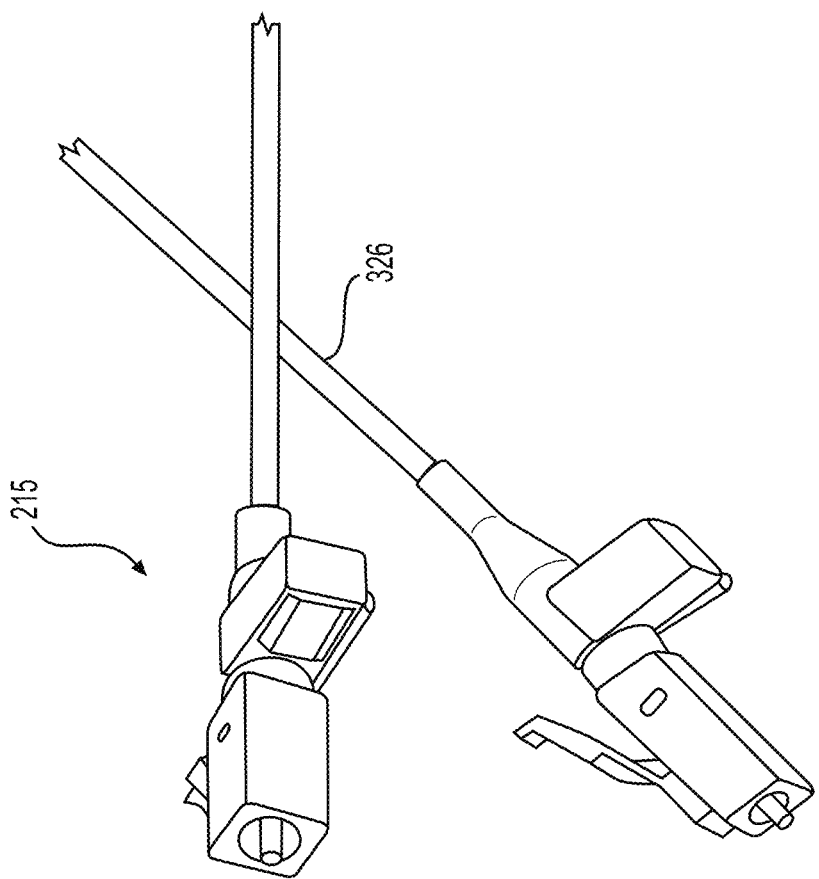

The apparatus comprised of the passive RFID receiver integrated circuit 210, ferrite core inductor 212 and ceramic capacitor 211 (FIG. 6) is designed to achieve the following unique functional characteristics:
1. High spatial resolution (<5 mm);
2. Passive operation of tag (e.g. no battery or separate power); and
3. Small size (<5 mm on a side).

Figure 7:
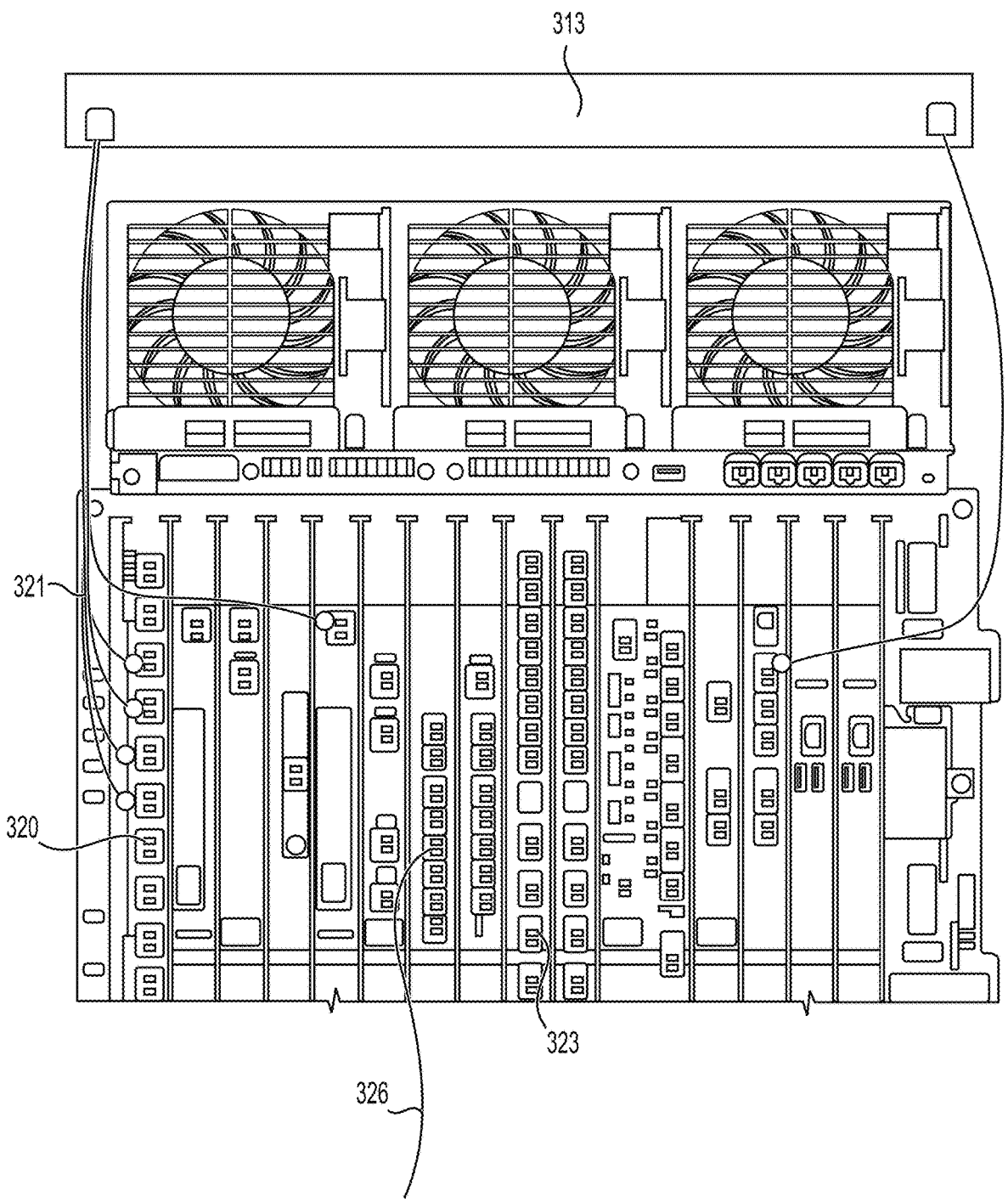
FIG. 7 illustrates a detailed example of a network equipment chassis requiring RFID port identification and tracking instrumented with an array of RFID reader antenna to read RFID tags associated with an array of network ports.

To maintain the high density of traditional fiber optic interconnect systems, it is necessary to produce miniature tags smaller than the size of the fiber optic connector components they are attached to. In a particular form of construction well suited for miniaturization and mass production (FIG. 6), the RFID integrated circuit 210, inductor 212, and capacitor 211 are surface mounted on a miniature flex circuit 213 that can be folded to a compact size and encapsulated to produce the final packaged RFID tag 214. These tags are provided in a variety of packaging (i.e. housing) configurations, including an RFID tag that clips onto standard LC simplex 215 and duplex 216 fiber connectors, as shown in FIG. 7. The plastic tag housing is selected to accommodate attachment methods to the connector. In one example, the tag housing includes a magnetic element enabling magnetic attachment of the antenna array or RFID probe tip to the RFID tag. The magnetic element may be a Neodymium permanent magnet or steel element. Alternatively, the packaged RFID tag can clip onto small form factor LC and MTP/MPO fiber optic connectors.

In a further example, each tag 214 may include an infrared (IR) or optical reflective location marker (e.g. IR reflective tape or coating) that is visible and readily distinguished by an optical scanner. In this case, each passive tag reflects illumination to assist in high-resolution location determination, and each tag reflects the RF signal carrier with a unique amplitude or phase modulation signature impressed therein on the carrier for identification purposes. IR or visible wavelength reflectors may be incorporated one the housing of passive RFID tags 214.

Figure 8:
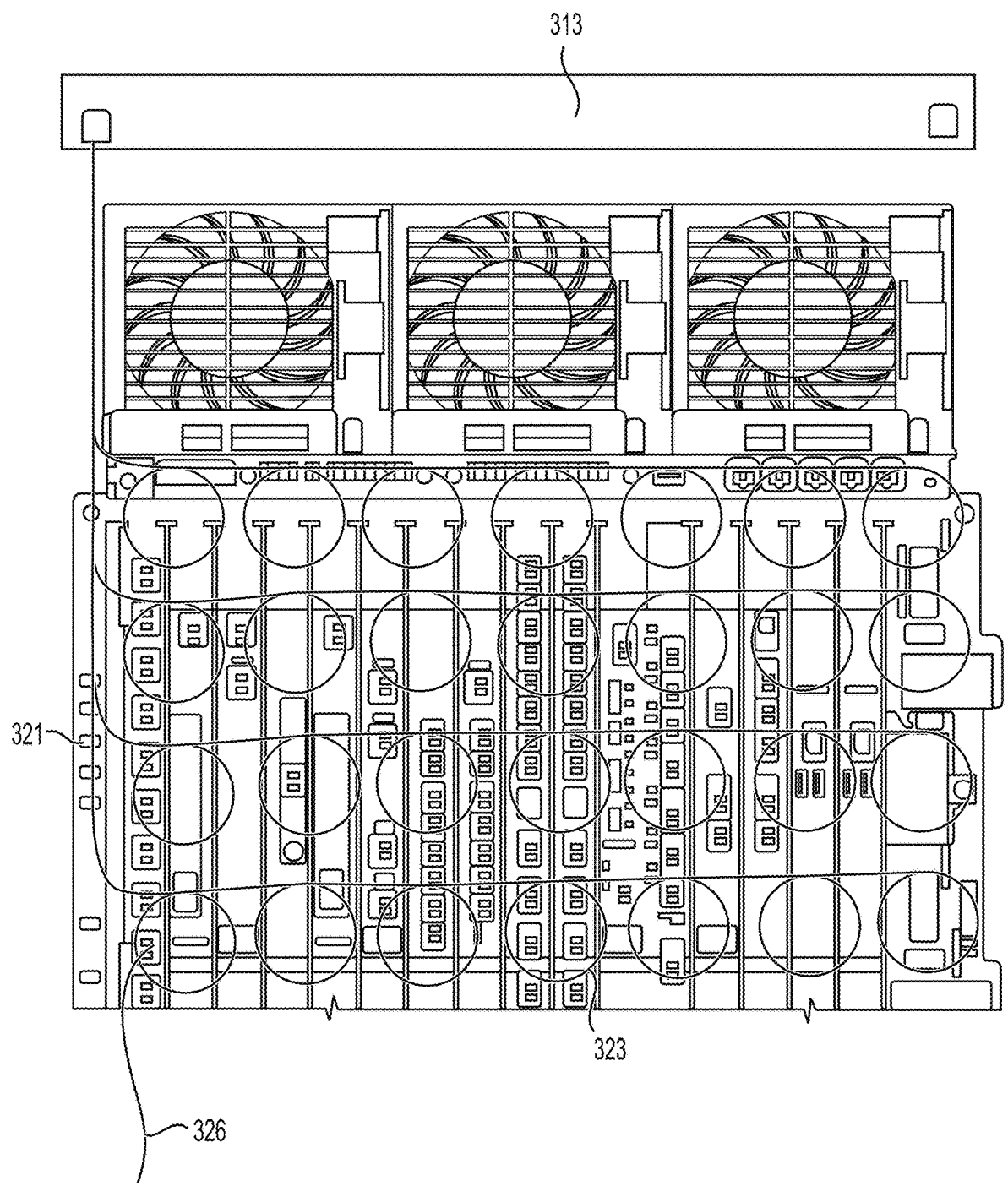
FIG. 8 illustrates a detailed example of a network device incorporating RFID port identification and tracking, instrumented with a distributed array of RFID reader antenna loops for complete coverage RF scanning coverage across an interface panel of the network device.
Figure 9:
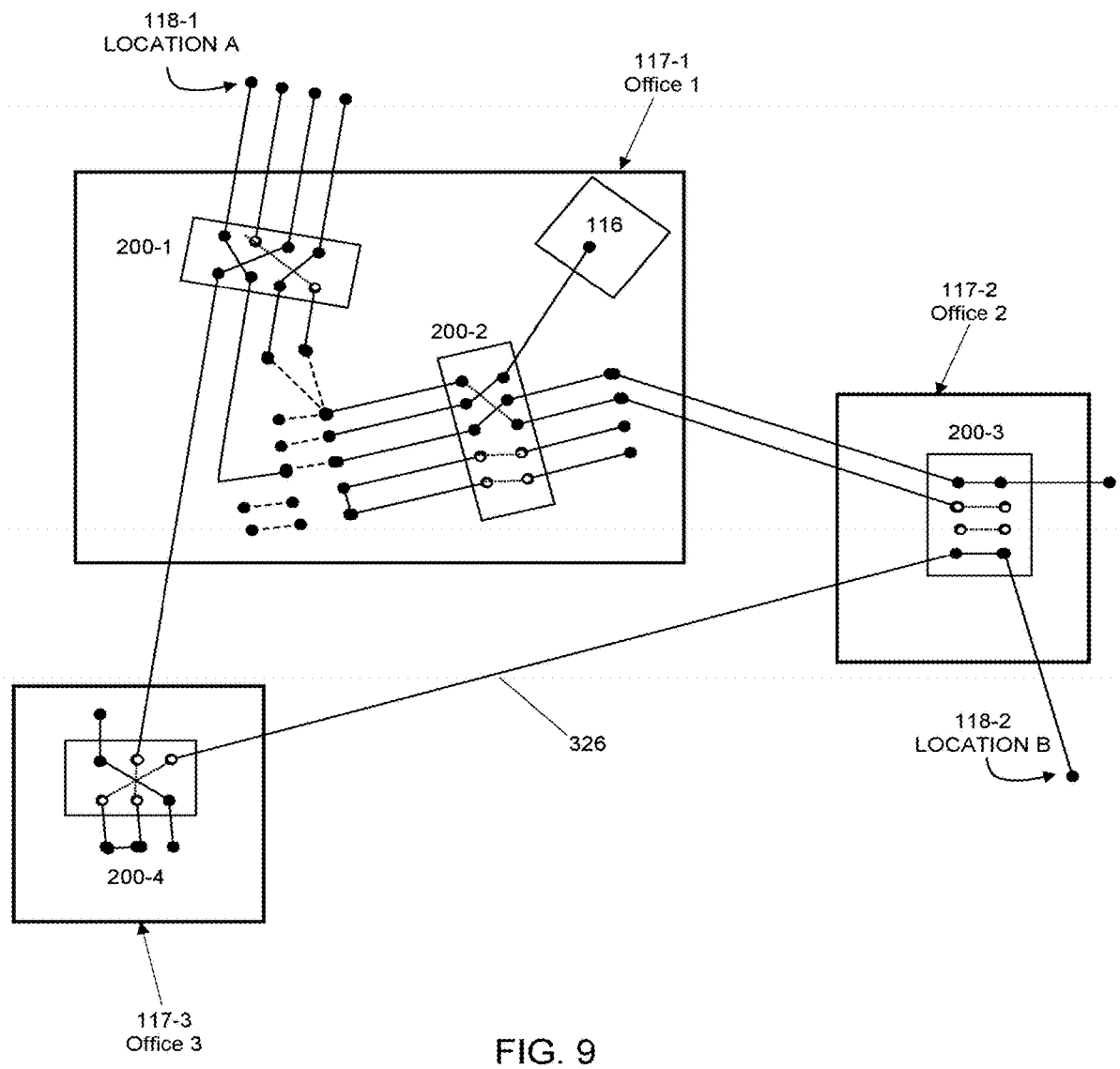
FIG. 9 illustrates a distributed network diagram including relationships between automated robotic cross-connects, network elements and the physical interconnections therebetween.

As detailed in FIGS. 8 and 9, a multiplexed, multi-channel RFID reader 313 with individually addressable antenna array 305 can be utilized to provide in-situ, real time monitoring of RFID tags on a network device (in contrast to deploying the scanning robot system 327 to the network device). Multiplexing of individual antenna elements 304 within the array 305 enables hundreds of tags 214 on cables 326 to be interrogated in rapid time succession by a single reader 313, for near real-time update rates and low upfront cost. An antenna array 305 of individual antenna elements 304, all elements connected to a single multiplexed LF-RFID reader 313, are distributed to the port locations by running the individual antenna wire pairs and attaching each antenna element to the interface panel 327 in the vicinity of each port 320 receiving a fiber optic cable 326, or to each physical asset that is tagged.

In a further example, compact passive RFID tags may be applied not only to the connectors at the ends of cables, but to the connector ports/receptacles online cards, pluggable optics, etc. This data is processed and automatically entered into a database of physical network links, so that the robot is able to also determine the location of additional data center assets such as transceivers.

In further accordance with this invention, the RFID discovery system enables several additional high-level functions to be performed by software residing on the management server 415. These functions are described next.

Fiber Link Search

The consolidation and processing of spatially overlapping RF and optical scans provide full visibility into the physical link configuration. This enables the software management system (FIG. 1) to provide a physical cable inventory and connectivity search function. Moreover, the search function accesses the stored database of network resources 111, such as type of circuit pack, router port, cross-connect port, wavelength, etc., all of which are identified by unique RFID serial numbers. The system is aware of which existing resources are available to establish connectivity along a target path and achieves high accuracy by eliminating human intervention. For example, if one or more ends of the different cable connections are attached to automated patch-panels, the system can switch connections automatically to provision, validate and transfer the necessary resources to support production workflows. In accordance with this invention, an error free, no-touch, automated process performs these steps.

Path Visualization

A path or network visualization function 106 presents an accurate and updated representation of the links between tagged network elements and network resources, to aid in mapping or in selecting network resources. This is analogous to physical mapping features and representations provided for highways, which are based on prior scanning using satellite imagery, GPS, and automobiles equipment with sensors to collect image and position data. Since the network is dynamic, these paths change over time and up to date, accurate data and visualization is essential to maintain reliable operation of the network.

FIG. 9 schematically represents a fiber network map to identify potential links between a location A and a location B. The solid lines represent optical links and the dashed lines represent electronic links. The distances between offices 117-1, 117-2, 117-3 are not to scale here, to more clearly illustrate the inter-relationships between connections. This map includes optical network elements such as the automated fiber cross-connects or patch-panels 200 and test equipment 116 to help visualize the available network resources. As is typical, there are many alternative paths to connect the location A 118-1 with location B 118-2. The shortest path or highest bandwidth path may be determined using the Dijkstra algorithm, for example.

Remote Provisioning and Routing

The provisioning automation function 105 in FIG. 1 enables the network to be configured and/or tested in an automatic fashion from a distant, centralized facility such as a network operations center, using existing testing resources for network link connectivity and various network elements. Asset records in database 114 associated with each physical asset 111 may include the functional characteristics, status, identifiers, and locations of the particular network elements. For example, the cabling records 110 in the database 114 may include fiber optic patch cords classified according to their particular fiber types (Single Mode Fiber SMF-28, bend insensitive SM fiber, dispersion shifted fiber, etc.), endpoint locations A and B, and termination types (splice, FC-APC connector, SC-UPC connector, LC-PC connector, etc.). Locations A and B can be described in terms of a particular physical port location within a particular rack, for example.

Typical network elements with physical ports include patch-panels, automated fiber cross-connects 200, optical switches, servers, storage devices and other devices that re-direct signals in the optical domain. Remote routing and process automation is achieved by transmitting interconnect reconfiguration commands to a cross-connect 200 control interface that sends commands to remote, automated fiber optic cross-connects deployed across the network. For example, after the user enters a start and destination location for the establishment of communication services, the processor's routing optimization software module determines one or more alternative paths that meet the selection criteria based on the accurate data ensured by the present invention. If the path can be completed with existing resources and network elements, the process automation software directs the one or more fiber optic cross-connects along the path to switch, such that the path of fiber links joined end-to-end form a contiguous communication path meeting the user's selection criteria. Moreover, network elements may include pluggable optics or transceivers, common network interfaces on packet switches and routers, operating at specific data rates, transmission protocols, wavelengths, and formats.

The physical interconnection discovery and management system disclosed herein offers significant advantages to providers of high bandwidth telecommunications services, including same-day and one-touch provisioning of high bandwidth fiber optic services. The ability to dynamically update an accurate map of the physical network topology, coupled with the ability of physical network interconnections to be reconfigured from a remote network operations center, enables the labor and time intensive provisioning and maintenance processes to be fully automated.

In a further embodiment of this invention, the process to implement automated physical network configuration management is disclosed. The information from multiple RFID scans 119, as well as registered and calibrated optical scans 113, and the stored database of annotated solid models of network equipment, is processed by the analysis module 107 on server 415, and then merged to create a virtual physical model of data center in 112. This process utilizes the following steps:
1. If the solid model of network equipment interface panels 237 (including the interface ports to which cables are attached) is not already available, the network device is optically scanned in three dimensions to produce a solid model of its interface panel. This is done using standard 3D scanning software to produce, for example, a standardized .STP or .IGS formatted file;
2. A solid model is created for at least the interface panel of the device, with location of each port within the three-dimensional model of the device identified;
3. An annotated solid model is stored in network element port module 111 of database 114;
4. The process is repeated for other network devices.

Figure 10:
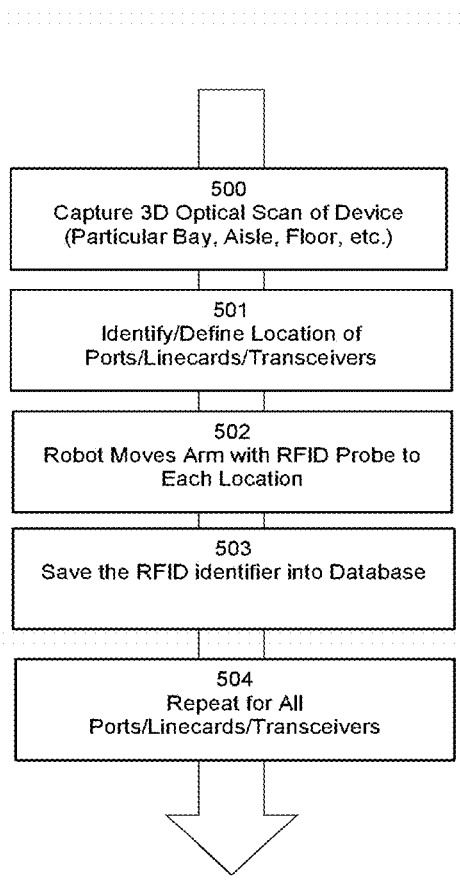
FIG. 10 is a flow chart of the process of training the system in accordance with the preferred embodiment of the present invention to discover initial RFID port locations and identifiers.

It is necessary to discover and map the network connectivity when the network elements are initially installed and deployed. The multi-step training/setup process at time of installation is summarized in the flow chart of FIG. 10. In step one 500, 3D optical scans of the network device are captured by the scanning robot to calibrate its position relative to rack 300. In step two 501, the locations of ports across panel 237 are extracted by comparison to three-dimensional annotated models stored after an initial data collection process. In step three 502, the robot moves arm to position RFID probe adjacent to each port location, within the detection range of a few mm In step four 503, the RFID identifier of any tag associated with that port is read out and stored in connectivity database. This process is then repeated for each network device in step five 504. The detailed process is described below:
1. Equipment/Racks/Bays are installed;
2. 3D optical and RF scans are performed by dual mode robot system 327, scans are calibrated based on known reference locations;
3. Data from multiple optical scans are stored in scan raw data module 113;
4. Data from multiple RF scans are stored in RFID raw data module;
5. Location of each RFID tag on network device model is determined by processing data performed using collected data;
6. Potentially, line-cards, chassis, etc. are also automatically identified by processing optical scan data 113;
7. Measured RFID tag identifiers associated with each port is saved in Connectivity records 112; and
8. Process is repeated for other network devices.

Figure 11:
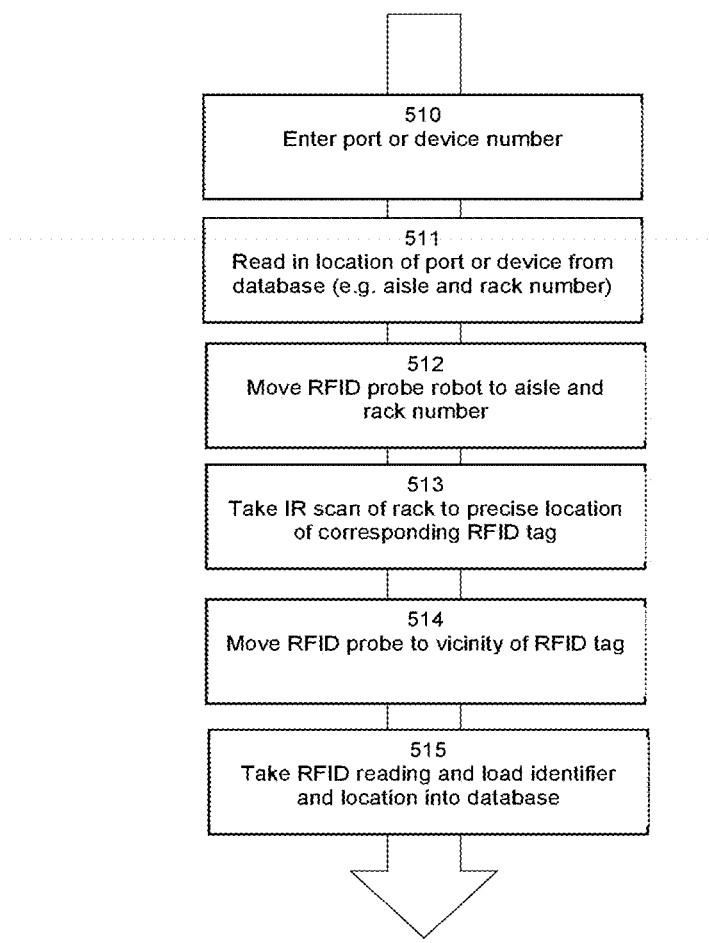
FIG. 11 is a flow chart of the process in accordance with the preferred embodiment of the present invention of monitoring of the physical network topology.

After this initial installation process is completed, the network should be periodically monitored at later times to ensure continued accuracy of the connectivity database. A flow chart of the physical network topology monitoring process is illustrated in FIG. 11 and is summarized below:
1. Select a port or device number for interrogation in step one 510;
2. Read in location of port or device from the database, to get, for example, the aisle, rack number, and coordinates relative to a given reference location, in step two 511;
3. Move robot with RFID probe to coordinates in step three 512;
4. Take a calibration scan of rack and determine precise location of corresponding RFID tag in step four 513;
5. Move RFID probe adjacent the RFID tag in step five 514; and
6. Perform RFID reading and load identifier and location into database 114 in step six 515.

In summary, the network configuration management system disclosed herein enables the physical network connectivity to be discovered and tracked in a fully automated way. The physical location of any of a multiplicity of densely distributed RFID tags 214 is determined by a mobile RFID robot's three-dimensional optical scanner module 308. The scanner creates the three-dimensional model of the particular equipment rack fiber optic interface surface and the location of tags 214 corresponding to ports 320 are stored along with the model. The port locations from the scan are used to position the RFID probe 307 to within several mm of any of the multiplicity of RFID tags for close range readout. Passive RFID tags are located at connector ports, line cards, etc. and are automatically entered into a database of physical network links.

To position the actuable RFID readout probe to within several mm of any of the multiplicity of RFID tags for close range readout one at a time, the navigation of the robotic RFID and optical scanning system 327 through the data center can be guided by reference markers or fiducials on the floor, network elements, bays or racks. To navigate through the data center during the data acquisition process, the robot includes a motorized, wheeled drive platform 309 that transports it along the floor. In a particular example, a floor grid-sensing device and/or gyroscope are used to determine the position of the robot within the data center while also providing sensing for collision avoidance. The robot navigation may be associated with a training process in tandem with a technician, to assist in avoiding obstacles (e.g. stray cables, boxes, open door of enclosure, etc.) while scanning the tags. This is typically done at the time each network device is installed.

The robot RFID reader probe 314 is attached to the distal end of an actuated probe arm 307 and is sufficiently compact to be able to access each port in the network device's interface panel despite any surrounding obstructions such as network cables, etc. The optical scanning module locates the tags based on the stored database of coordinates, so that the RFID probe 307 can be driven to the correct physical location for tag readout. This stored location is subsequently used to guide the probe arm 307 and the RFID probe attached therein to the vicinity of the RFID tag 214 for proximity readout. The robot scanning system 327 includes both RF and optical scanning capabilities. A centralized server 415 processes the scan data and communicates with the controller module 405 of the robot scanning system 327 through a wireless communications link. A battery and charging module 406 powers the system 327. The wireless module 311 is used to establish communication between the robot system 327 and the server 415. The three-dimensional camera 308 is used to scan the equipment and locate the tags so that the RFID probe can be properly positioned next to any tag. The RFID probe module 314 consists of the high spatial resolution/close range RFID probe antenna and the associated RFID demodulation electronics.

Those skilled in the art will readily observe that numerous modifications and alterations of the system and apparatus may be made while retaining the teachings of the invention. Accordingly, the above disclosure should be construed as limited only by the metes and bounds of the appended claims.

I claim:

1. An RFID (radio frequency identification) tracking system for physical network connectivity assets within a data center, for automatically discovering and tracking a connection configuration for network cables terminated in connectors that are connected at their endpoints to specified receiving ports, the system comprising:
   one or more equipment racks including a plurality of networked devices therein with a plurality of receiving ports;
   one or more robot modules, each comprising a controller module, an actuable RFID probe, an optical scanner, a battery module, and a wireless communication module;
   a distributed multiplicity of the network cables, each cable including an RFID tag with less than 5 mm readout range and attached in a vicinity of endpoint(s) of network cables;
   the actuable RFID probe being able to move in close proximity to each receiving port based upon pre-determined receiving port locations, such that RFID tag identifiers are read out;
   a management server which includes data of the RFID tag identifiers associated with each cable, said identifiers providing data for said server for uniquely identifying a particular receiving port based upon data in a stored database of the receiving port locations; and
   one or more automated cross-connect switches with a multiplicity of receiving ports, the one or more cross-connect switches being configured to launch an optical time domain reflectometer signal down any of the multiplicity of network cables to determine whether said cable is functional.

2. A system in accordance with claim 1, wherein said RFID tags are passive and require no integral battery, and are responsive to substantially periodic electromagnetic signals with frequency in the range of 100 to 200 kHz.

3. A system in accordance with claim 1, wherein said RFID tags are less than about 50 $mm^3$ in volume.

4. A system in accordance with claim 1, wherein said one or more robot modules comprise a motorized, wheeled platform with an integral battery power source and one or more sensors enabling unobstructed transport through said data center.

5. A method for monitoring physical network connectivity configuration for a multiplicity of fiber optic cables with miniature RFID (radio frequency identification) tags at their ends, that are connected to ports on a multiplicity of network devices within a multiplicity of equipment racks, within a multiplicity of aisles, and accessible by a moveable robot carrying an RFID reader with an extendable RFID probe, said robot being configured to travel along or across said aisles to a particular port location while under direction of a control system communicating with a stored database including a position of each port, said method comprising:
   (A) entering a port location identifier and a network device identifier into the control system;
   (B) reading in the particular port location and the network device identifier from the database;
   (C) positioning said robot based on said location to a particular aisle and a particular rack;
   (D) extending the RFID probe from said robot moving along one of said aisles, to position said probe in a vicinity of a particular RFID tag associated with the particular port;
   (E) energizing and reading a tag identifier associated with the particular RFID tag using the RFID reader; and
   (F) updating said tag identifier for the particular port within the database.

6. A method in accordance with claim 5, further including:
   withdrawing the RFID probe back into the robot; and
   repeating steps (A)-(F) for each of the multiplicity of fiber optic cables.

7. A method in accordance with claim 5, further including:
   transmitting the tag identifier to the control system.

8. A method in accordance with claim 5, wherein the RFID probe excites the RFID tag with a periodic electrical signal of 10V or higher in amplitude as measured across the probe and with a nominal frequency of about 125 kHz.

9. A method for automatically discovering a physical topology of a network, including generation of a database of how cables in the network are connected to a multiplicity of ports on a further multiplicity of network devices at spaced apart locations defined by a physical address, floor, bay, aisle and/or rack, through a combination and correlation of electronic RFID (radio frequency identification) and optical scan data, said method comprising:
   capturing three-dimensional optical scan data for each said network device at the spaced apart locations;
   identifying each port within the scan data, extracting its corresponding physical location information from the optical scan data, and storing said location information in said database;
   positioning an RFID probe in a vicinity of each port based on said location information;
   reading an RFID electronic tag identifier associated with said port and cable plugged therein;
   storing the RFID tag identifier for said port in said database; and
   repeating above process for a remainder of the multiplicity of ports.

10. A method in accordance with claim 9, wherein said ports include SC, LC and/or MPO/MTP fiber optic connector ports.

11. A method in accordance with claim 9, wherein said optical scan is performed with light at a visible or infrared wavelength.

12. A method in accordance with claim 9, including recording the RFID electronic tag identifiers at opposite cable ends for each particular cable.

13. A dual modality physical asset discovery robotic scanning system responsive to both optical and RF (radio frequency) excitation for identifying network connectivity of a plurality of network elements in a data center, said data center including a plurality of aisles in which a plurality of network equipment racks are located, each said equipment rack containing one or more of said network elements, said system including:
   an actuatable, extendable probe arm having an RFID (radio frequency identification) reader disposed at a distal end thereof for positioning said reader in close proximity to an array of a multiplicity of RFID tags adjacent to a plurality of communication cables at one or more connector ports;

an optical scanning system to capture a digital representation of a geometry of the equipment rack and the network elements therein, to produce scaled, three-dimensional representations for each network element within the rack, in which locations of connector ports have been identified;

a database in which an RFID tag identifier of each of the communication cables and a three-dimensional model of each network element are stored; and a processing system for combining data comprised of network element optical scans, network element and cable RFID scans, and three-dimensional reference models of network elements, said processing system thereby producing an accurate accounting of the network connectivity established by said communication cables.

14. A system in accordance with claim 13, wherein said probe arm comprises a telescopic, motorized arm for precise positioning of said RFID reader under system control.

15. A system in accordance with claim 13, wherein the three-dimensional reference models provide scaled representations of said network elements to better than 1 mm accuracy.

16. A system in accordance with claim 13, wherein the RFID reader is configured to be positioned to better than 1 mm location accuracy.

17. A system in accordance with claim 13, wherein the RF excitation is centered about 125 kHz.

18. A system in accordance with claim 13, wherein said RFID reader further comprises a capacitor and an inductor providing a tuned resonance at 125 kHz.

19. The system of claim 13, wherein said processing system produces an accurate accounting of the network connectivity established by all of said communication cables.

* * * * *